(12) United States Patent
Moussavi

(10) Patent No.: US 8,766,915 B2
(45) Date of Patent: Jul. 1, 2014

(54) METHODS AND APPARATUS FOR INCREMENTAL PREDICTION OF INPUT DEVICE MOTION

(75) Inventor: Farshid Moussavi, Oakland, CA (US)

(73) Assignee: Apple Inc., Cupertino, CA (US)

( * ) Notice: Subject to any disclaimer, the term of this patent is extended or adjusted under 35 U.S.C. 154(b) by 879 days.

(21) Appl. No.: 12/207,452

(22) Filed: Sep. 9, 2008

(65) Prior Publication Data

US 2010/0060573 A1 Mar. 11, 2010

(51) Int. Cl.
*G06F 3/033* (2013.01)

(52) U.S. Cl.
USPC .......................................... 345/158

(58) Field of Classification Search
USPC .................... 345/156–178; 702/141
See application file for complete search history.

(56) References Cited

U.S. PATENT DOCUMENTS

| | | | | |
|---|---|---|---|---|
| 3,225,179 | A * | 12/1965 | Chestnut et al. | 700/44 |
| 4,839,838 | A * | 6/1989 | LaBiche et al. | 708/141 |
| 5,638,092 | A * | 6/1997 | Eng et al. | 345/158 |
| 6,409,687 | B1 * | 6/2002 | Foxlin | 600/595 |
| 6,826,478 | B2 * | 11/2004 | Riewe et al. | 701/220 |
| 7,216,055 | B1 * | 5/2007 | Horton et al. | 702/153 |
| 7,421,343 | B2 * | 9/2008 | Hawkinson | 701/220 |
| 2005/0104867 | A1 | 5/2005 | Westerman et al. | |
| 2006/0028446 | A1 * | 2/2006 | Liberty et al. | 345/158 |
| 2006/0055584 | A1 * | 3/2006 | Waite et al. | 342/22 |
| 2006/0279549 | A1 | 12/2006 | Zhang et al. | |
| 2007/0146325 | A1 * | 6/2007 | Poston et al. | 345/163 |
| 2009/0153482 | A1 * | 6/2009 | Weinberg et al. | 345/163 |

OTHER PUBLICATIONS

Markus Kohler, Using the Kalman Filter to track Human Interactive Motion—Modelling and Initialization of the Kalman Filter for Translational Motion, 1997.*
U.S. Appl. No. 12/235,326, filed Sep. 22, 2008.

* cited by examiner

*Primary Examiner* — William Boddie
*Assistant Examiner* — Carolyn R Edwards
(74) *Attorney, Agent, or Firm* — Fish & Richardson P.C.

(57) ABSTRACT

Methods and apparatus for incremental prediction of input device motion. In one embodiment, the input device comprises one or more sensors adapted to output motional data of the input device as measured at a certain period. A prediction of input device motion is generated based upon the last prediction and a weighted error in estimate determined by the sensory output. According to one embodiment, the weight is calculated as a Kalman gain. In one embodiment, once the prediction has been generated, it is provided to a display update algorithm adapted to orient a navigational object upon an associated display screen.

15 Claims, 5 Drawing Sheets

METHODS AND APPARATUS FOR INCREMENTAL PREDICTION OF INPUT DEVICE MOTION

FIELD OF THE INVENTION

The present invention relates generally to the field of data input. More particularly, the present invention is directed in one exemplary aspect to incrementally predicting the motion of an input device based upon observed data and a prior prediction.

SUMMARY OF THE INVENTION

Various aspects of the present invention are directed to incremental prediction of input device motion. In one embodiment, the input device comprises one or more sensors (e.g., accelerometers) adapted to output motion data of the input device as measured at certain periods of time. The motion data may include any combination of position, velocity, or acceleration data.

A prediction of motion is generated based upon the last prediction and an error in estimation calculated from the sensory output. In one embodiment, the error in estimation is assigned a weight that is based in part upon levels of noise expected in readings taken by the one or more sensors. In some embodiments, the weight is calculated as a function of an incrementally adjusted margin of error that is updated after each prediction has been generated. In one embodiment, the weight is calculated as a Kalman gain and is inversely related to the levels of noise.

Once a prediction has been generated, it may then be provided to a display update algorithm adapted to orient a navigational object (for example, a pointer, cursor, selector box, or other such indicator) upon a display screen. Optionally, one or more reset conditions may be used in order to prevent iterative margin of error buildups.

Some embodiments of the present invention advantageously comprise a prediction algorithm with linear complexity. In one embodiment, a prediction algorithm with linear complexity preserves computational resources since the prediction for the next period does not require calculations for all periods from the initial period until the prior period. Thus, the amount of computational power required for prediction of input device motion is smaller than the amount of computational power required by algorithms comprising larger complexities.

DETAILED DESCRIPTION OF THE EXEMPLARY EMBODIMENTS

Figure 1:
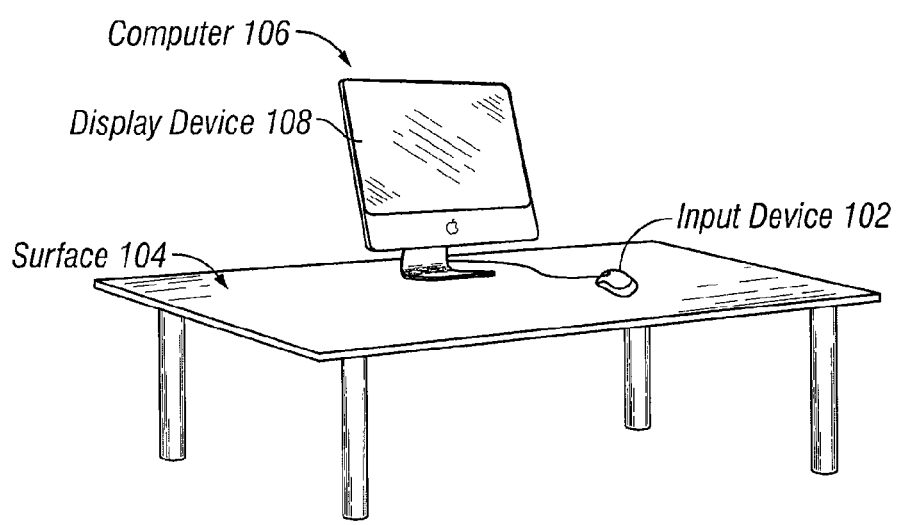
FIG. 1 is a block diagram illustrating a typical environment in which an input device may be used according to one embodiment of the present invention.

In the following description of exemplary embodiments, reference is made to the accompanying drawings which form a part hereof, and in which it is shown by way of example specific embodiments in which the invention may be practiced. It is to be understood that other embodiments may be utilized and structural changes may be made without departing from the scope of the present invention.

As used herein, the term "application" includes without limitation any unit of executable software that implements a specific functionality or theme. The unit of executable software may run in a predetermined environment; for example, a downloadable Java Xlet™ which runs within the JavaTV™ environment.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, MATLAB, assembly language, scripting languages, markup languages (e.g., HTML, SGML, XML, VOXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

As used herein, the term "interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the term "module" refers to any type of software, firmware, hardware, or combination thereof that is designed to perform a desired function.

As used herein, the terms "processor," "microprocessor," and "digital processor" refer to all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die, or distributed across multiple components.

As used herein, the terms "receiving device" and "receiver" include without limitation video game consoles, set-top boxes, televisions, personal computers (whether desktop, laptop, or otherwise), digital video recorders, communications equipment, terminals, mobile devices, and display devices.

As used herein, the term "wireless" refers to any wireless signal, data, communication, or other interface including, without limitation, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

FIG. 1 is a block diagram illustrating a typical environment in which an input device can be used according to one embodiment of the present invention. An input device 102 is initially positioned upon a surface 104 such as a desk or a tabletop. In order to generate input data, a user manipulates the input device relative to the surface 104.

Note that in FIG. 1, the surface 104 is depicted as being flat or substantially flat; however, neither condition is necessary according to embodiments of the present invention. Also note that in some embodiments, the surface 104 need not necessarily be situated beneath the input device 102. For example, the surface 104 may be tilted, situated above the input device 102, inverted, or vertically oriented. Also note that in certain embodiments, multiple surfaces 104 can be utilized.

A receiving device (such as the depicted computer 106) is adapted to receive input data generated from the input device 102. In one embodiment, the receiving device comprises at least one network interface adapted to receive the generated data. The input device 102 can connect to the receiving device over a wireless or a wired communication link (such as a serial bus cable or other physical connector).

The receiving device is adapted to display a navigational object (for example, a pointer, cursor, selector box, or other such indicator) upon its display screen 108. During operation, when the user manipulates the input device 102 relative to the surface 104, the input signals are transmitted to the computer 106 and the navigational object responds according to the user's input. It is understood that the receiving device can be any type of computing device having a display such as an iMac™ computer or a personal computer having a separate display monitor, for example. Other types of computing devices having a display or connected to a display (e.g., by a wired or wireless communication link) for displaying navigational objects would be readily apparent to those of ordinary skill in the art.

Figure 2:
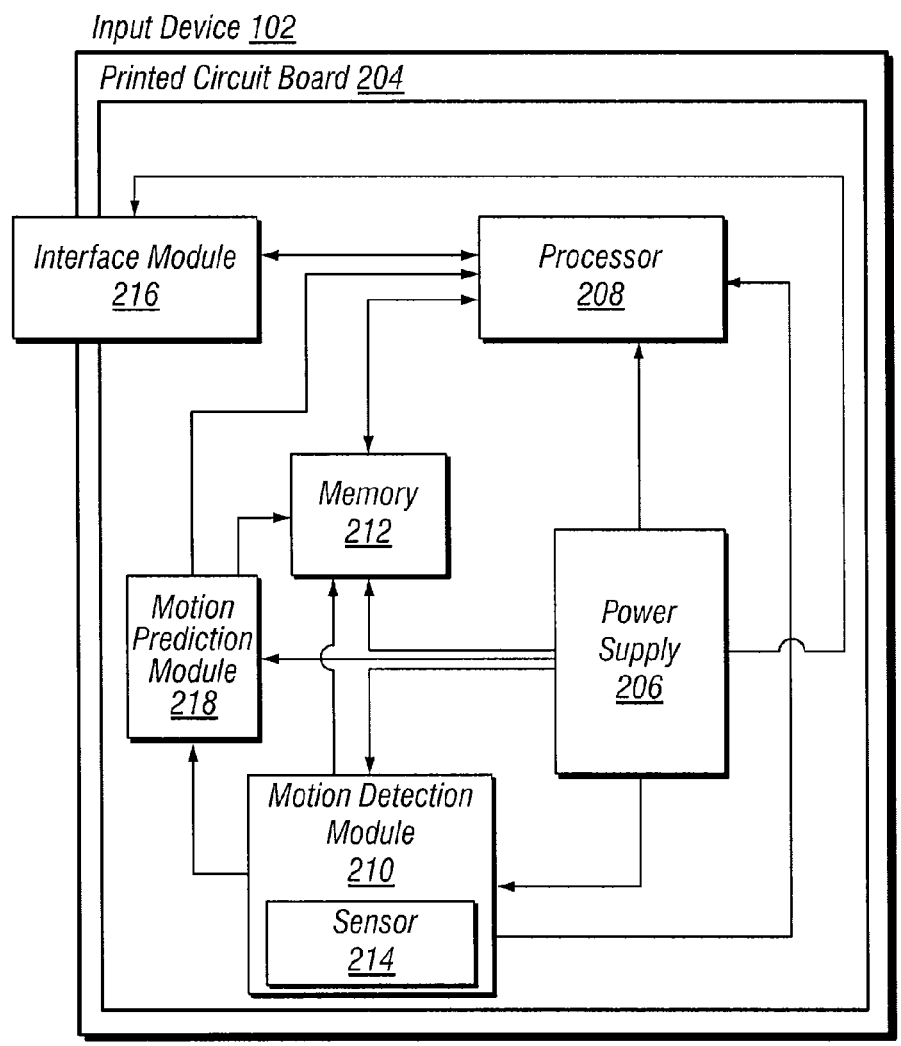
FIG. 2 is a system diagram of a modular arrangement of an input device according to one embodiment of the present invention.

FIG. 2 is a system diagram of a modular arrangement of the input device 102 according to one embodiment of the present invention. The input device 102 houses a printed circuit board 204 enabling communication and data transfer between modules connected to it.

A power supply 206 provides a source of power to modules electrically connected to the printed circuit board 204. In some embodiments, power is supplied externally by one or more conductive wires, for example, from a power cable or serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations utilizing, for example, registers, cache memory, data buffers, main memory, mass storage, and/or removable media. In some embodiments, the memory 212 is configured to store instructions for execution by the processors 208, as discussed in further detail below. In one embodiment, the memory 212 is adapted to store motion data generated from a motion detection module 210. In one embodiment, the memory 212 is adapted to store prediction data generated from a motion prediction module 218. In one embodiment, at least a portion of the motion data and/or the prediction data are stored in a remote memory module (e.g., the hard disk of the computer 106).

One or more processors 208 are adapted to execute instructions by loading and storing data to the memory 212. The instructions may include, for example, instructions for data conversions, formatting operations, communication instructions, arithmetic operations, and/or storage and retrieval operations. Additionally, the processors 208 may comprise any type of digital processing devices including, for example, digital signal processors, reduced instruction set computers, general-purpose processors, microprocessors, gate arrays, programmable logic devices, reconfigurable compute fabrics, array processors, and application-specific integrated circuits. Note also that the processors 208 may be contained on a single unitary IC die or distributed across multiple components.

An interface module 216 enables data to be transmitted and/or received between two or more devices. In one embodiment, data transmitted to a receiving device is first packetized and processed according to one or more standardized network protocols. The interface module 216 may accommodate any wired or wireless protocol including, without limitation, USB, FireWire, Ethernet, Gigabit Ethernet, MoCA, radio frequency tuners, modems, WiFi, Bluetooth, WiMax, and/or Infrared Data Association.

A motion detection module 210 comprising one or more sensors 214 enable the input device 102 to determine acceleration of the input device 102 during a given instant, or alternatively, over a given period of time. Various types of sensors and/or sensor combinations may be used for determining acceleration according to embodiments of the present invention. For example, the sensors 214 can comprise gyroscopes, accelerometers, optical sensors, motion sensors, and/or force sensors. In one embodiment, the sensors 214 comprise one or more accelerometers adapted to detect the current acceleration of the input device 102. The accelerometers can measure acceleration of the input device 102 by any number of means, including, for example, inclination sensing, vibration, force detection, and/or shock detection.

In one embodiment, the sensors 214 are implemented as part of a micro electromechanical system (MEMS). Optionally, the micro electromechanical system may comprise a dedicated microprocessor adapted to interact with one or more micro-sensors responsible for receiving external data.

In other embodiments, the acceleration of the input device 102 is externally estimated, such as by a tracking system or via one or more transceivers located within communicative range of the input device 102. According to some embodiments, the interface module 216 is adapted to transmit signals to the one or more transceivers. In one embodiment, the time it takes the transceivers to receive subsequent signals transmitted by the input device 102 is used as a basis to calculate the acceleration of the input device 102.

A motion prediction module 218 is adapted to predict motion of the input device 102 based in part upon motion data generated by the motion detection module 210. In one embodiment, the motion prediction module 218 is adapted to predict the motion of the input device 102 incrementally (i.e., without requiring recalculations of each previous step of the prediction history). Note that a prediction may comprise any type or combination of kinematical data according to embodiments of the present invention. The kinematical data can include, for example, position, velocity, and/or acceleration of the input device 102 at a given instant, or alternatively, over a given period of time. Additionally, any data structure or logical structure may be used to represent the prediction (e.g., scalars, vectors, matrices, equations, variables, coordinates and/or any combination thereof).

According to one embodiment, once a prediction has been generated by the motion prediction module 218, the prediction is provided as input to a display update module (not shown). The display update module is adapted to orient a navigational object (for example, a pointer, cursor, selector box, or other such indicator) upon a display screen 108. Additionally, the display update module may comprise any combination of hardware, firmware, and/or software. In some embodiments, the display update module is disposed within a remote device (e.g., the hard disk of the computer 106). In other embodiments, the display update module is disposed within the memory 212 of the input device 102. In still other embodiments, portions of the display update module are distributed across multiple devices and/or device modules.

Various methods, processes, and systems for predicting motion of the input device 102 are now described. Note that the motion prediction module 218 in the embodiment depicted by FIG. 2 may be implemented by any of the following techniques according to embodiments of the present invention.

Figure 3:
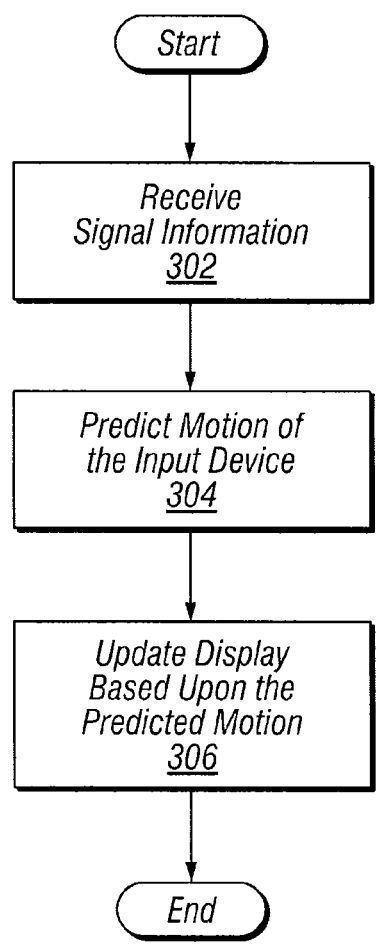
FIG. 3 is a high-level flow diagram illustrating a method of updating a display based upon predicted motion of an input device according to one embodiment of the present invention.

FIG. 3 is a high-level flow diagram illustrating a method of updating a display based upon predicted motion of an input device 102 according to one embodiment of the present invention.

At block 302, signal information is received. In some embodiments, the signal information comprises acceleration data generated from one or more sensors. In some embodiments, the signal information comprises data that is derived from the output generated by one or more sensors. For example, in some embodiments, a velocity value is derived by integrating a detected acceleration value. In other embodiments, a velocity value is derived by differentiating a detected position value.

Note also that multiple independent means of motion detection can be used according to embodiments of the present invention. For example, in one embodiment, the input device 102 comprises a set of accelerometers adapted to measure acceleration, and a vibration module adapted to estimate the velocity of the input device 102 based upon detected vibrational signals. In some cases, the accuracy of the motion estimate and the associated margin of error are a function of the total number of independent means of measurement available.

As stated above, various types of sensors and/or sensor combinations may be used for detecting motion, including, for example, gyroscopes, accelerometers, optical sensors, motion sensors, and/or force sensors. In some embodiments, the signal information is based on the output from one or more sensors that are situated externally from the input device 102. In some embodiments, a portion of the signal information describes vibrational data resulting from the input device 102 sliding upon the surface 104 as discussed in further detail in co-pending and commonly owned U.S. patent application entitled, "Using Vibration to Determine the Motion of an Input Device," U.S. application Ser. No. 12/235,326, filed Sep. 22, 2008, the entirety of which is incorporated by reference herein.

At block 304, motion of the input device 102 is predicted. In one embodiment, the prediction is based in part upon a past prediction and the output from a weighting function. According to one embodiment, the output from the weighting function modulates a quantity related to signal information observed at the same period for which the estimate is made. Note that various processes for predicting motion of the input device 102 are described in more detail below (see, e.g., FIGS. 4-5 and accompanying text).

At block 306, the display is updated based upon the predicted motion. In one embodiment, a position is provided as input to a display update module disposed within the receiving device (not shown). The display update module subsequently processes the data so as to reflect changes in the position of a navigational object (e.g., a pointer, cursor, selector box, or other such indicator) on a display screen.

Figure 4:
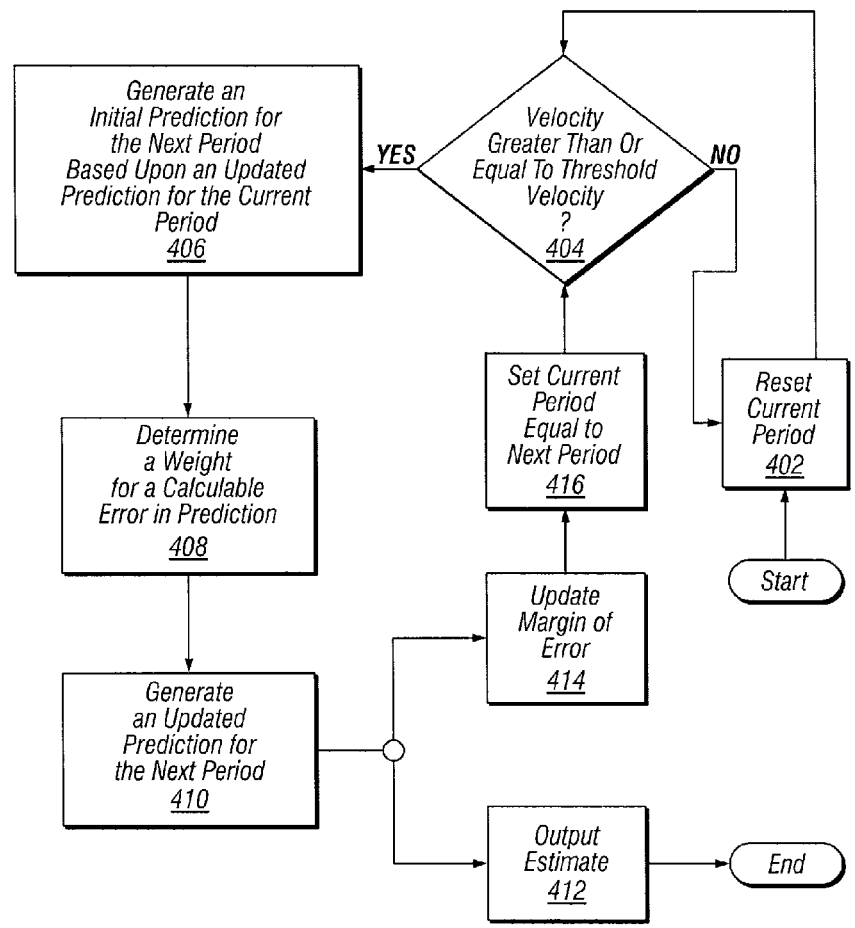
FIG. 4 is a flow diagram illustrating a method of predicting motion of the input device based upon received signal information according to one embodiment of the present invention.

FIG. 4 is a flow diagram illustrating a process of predicting motion of the input device 102 based upon received signal information according to one embodiment of the present invention.

After startup, the process begins at block 402, wherein a current period along with any associated data is reset. In one embodiment, the current period represents a discrete period in the motion prediction process and can be implemented by way of a timer, timing logic, or similar mechanism. In one embodiment, the current period is represented by an integer value which is initialized to zero and is incremented by one upon each tick of the timer (as shown in block 416). When the current period is reset, the current period is set to zero, thus indicating the beginning period of the next iteration of the motion prediction process. Note, however, that any value may be used to designate the beginning period according to embodiments of the present invention.

At decision block 404, a determination is made as to whether the present velocity of the input device 102 exceeds a designated threshold velocity (e.g., zero). If the velocity does not exceed the threshold velocity (e.g., the input device 102 has stopped moving or remains at rest), the initial periodic state is retained. Otherwise, control passes to block 406. Note that in one embodiment, periodic resets associated with the input device's velocity falling beneath the threshold velocity mitigate the effects of an iterative margin of error buildup.

At block 406, an initial prediction of the input device's 102 position, velocity, and acceleration at the next period is generated based upon an updated prediction of the input device's 102 position, velocity, and acceleration at the current period and a proxy for the unknown acceleration input (i.e., the change in actual acceleration between the next period and the current period. If an updated prediction of the input device's 102 position, velocity, and acceleration at the current period does not yet exist (e.g., during an initial iteration), the value of the updated prediction can be taken to be zero.

It is also worth noting that any value or set of values which reasonably correlate with a change in the actual acceleration of the input device 102 can serve as the proxy for the input value according to embodiments of the present invention. In one embodiment, the proxy comprises a previously calculated acceleration estimate for the next period. In one embodiment, the proxy is based in part upon a set of newly observed data (i.e., data measured for the next period). According to one embodiment, the set of newly observed data ensures that the predicted motion values for the next period comprise at least one deterministic component (i.e., that the estimated acceleration of the input device 102 at the next period is not always assumed to be equal to the estimated acceleration of the input device 102 at the current period, thus yielding a constant acceleration).

At block 408, a weight is determined for a calculable error in prediction. In one embodiment, the weight comprises a value in the range of 0-1, inclusive, and is a function of the amount of noise expected in measurement. The amount of noise expected in measurement, or measurement noise, is the error between a true value in a system and its observed value due to imprecision in measurement. In one embodiment, a certain level of measurement noise is associated with each sensor 214 that is used to detect kinematical data (e.g., motion sensors, accelerometers, force sensors, etc.). In one embodiment, the measurement noise can be taken directly from the specification sheet of one or more sensors 214 or independently determined from a calibration sequence executed by the input device 102. Other known methods of detecting measurement noise may be utilized in accordance with various embodiments of the present invention.

In one embodiment, the weight determined for the calculable error in prediction is inversely related to measurement noise. That is to say, a greater weight may be assigned when little or no noise is expected in the measurement, while a smaller weight may be assigned when a high amount of noise is expected in the measurement. The weight thus serves to scale the calculable error in prediction.

In one embodiment, the weight is calculated as a Kalman Gain and is a function of an incrementally adjusted margin of error (as described in further detail below with respect to FIG. 5). However, any form of modulation, weighting, filtering, and/or significance determination known in the art can be used according to the present invention.

At block 410, an updated prediction for the next period is generated. In one embodiment, the updated prediction comprises a sum of the initial prediction and a weighted error in prediction. In a further embodiment, an error in prediction comprises the difference between the acceleration observed at the next period (e.g., as output by an accelerometer) and the acceleration predicted for the current period. After the prediction is generated, it is output at block 412.

At block 414, a margin of error is updated for use in subsequent iterations of the method (particularly, for block 408). In one embodiment, the covariance for the next period is calculated based in part upon process noise, measurement noise, and the covariance calculated for the current time period. After the margin of error has been updated, the current period is set to be equal to the next period in block 416, and the process continues per block 404.

Figure 5:
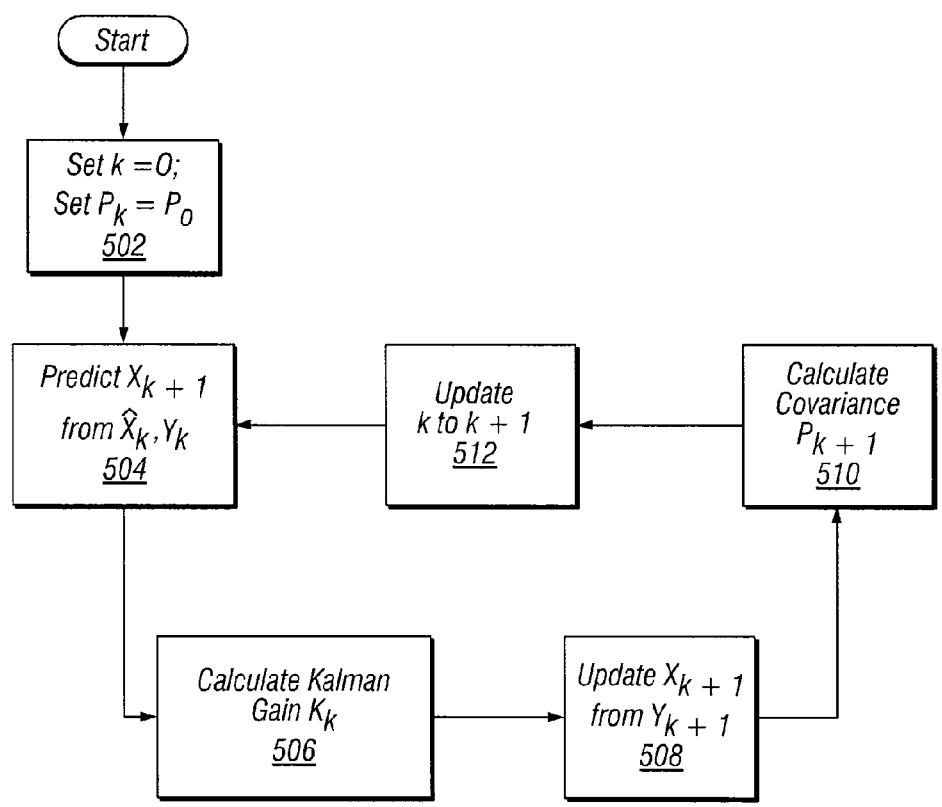
FIG. 5 is a flow diagram illustrating a method of predicting motion of the input device based upon received signal information according to another embodiment of the present invention.

FIG. 5 is a flow diagram illustrating a method of predicting the motion of the input device 102 based upon received signal information according to another embodiment of the present invention. As will be appreciated by those familiar with the art, a Kalman Filter may be used to estimate the state of a dynamic system from a series of noisy measurements. One embodiment of the present invention therefore utilizes a Kalman Filter in order to facilitate motion prediction.

An exemplary method depicted by FIG. 5 includes the following four steps: (i) generating a forward prediction $x_{k+1}$ 504; (ii) calculating a Kalman gain $K_k$ 506; (iii) updating the prediction $x_{k+1}$ based upon a new measurement $y_{k+1}$ 508; and (iv) calculating the covariance $P_{k+1}$ corresponding to the next period 510.

In the discussion that follows, k comprises an integer representation of a period such that k+1 denotes the period subsequent to k. P comprises a matrix of margin of error values, $s_w$ comprises the process noise, and $s_z$ comprises the measurement noise. The vector x comprises three values p, v, and a which denote position, velocity, and acceleration, respectively. The matrix A relates position and velocity to acceleration with respect to a given time t. The input value $u_k$ represents a change in acceleration exhibited between the next period k+1 and the current period k; the vector B modulates the input value $u_k$. C is a vector specifying which values of p, v, and a to consider for a given quantity. $K_k$ denotes the Kalman gain for the period k, and the value $y_k$ comprises the measured value for the period k.

Equations corresponding to the four steps described above are now provided, and subsequently discussed in turn with respect to FIG. 5:

$$x_{k+1} = (A\hat{x}_k + Bu_k) \quad \text{(1) Forward Prediction}$$

$$K_k = AP_k C^T (CP_k C^T + S_Z)^{-1} \quad \text{(2) Kalman Gain}$$

$$\hat{x}_{k+1} = (A\hat{x}_k + Bu_k) + K_k(y_{k+1} - C\hat{x}_k) \quad \text{(3) Measurement Update}$$

$$P_{k+1} = AP_k A^T + S_w - AP_k C^T S_z^{-1} CP_k A^T \quad \text{(4) Covariance Calculation}$$

According to one embodiment, the quantities are defined as follows:

$$x = \begin{vmatrix} p \\ v \\ a \end{vmatrix}$$

$$A = \begin{vmatrix} 1 & t & 0.5t^2 \\ 0 & 1 & t \\ 0 & 0 & 1 \end{vmatrix}$$

$$B = 0$$

$$C = |0\,0\,1|$$

$$P_0 = S_w = \begin{vmatrix} 0.25t^4 & 0.5t^3 & 0.5t^2 \\ 0.5t^3 & t^2 & t \\ 0.5t^2 & t & 1 \end{vmatrix} \sigma_a^2$$

$$S_z = \sigma_a^2$$

In one embodiment, the quantity $\sigma_a^2$ comprises a constant denoting the measurement noise of the system, and may be taken directly from the specification sheet of one or more sensors 214 or determined from a calibration sequence executed by the input device 102. Note that the above examples are merely illustrative in nature; in general, any method known in the art may be used for determining the measurement noise according to embodiments of the present invention.

At block 502, k is initially set to zero, and the margin of error matrix P is initialized to the value given at $P_0$. Note that in one embodiment, k and $P_k$ are reset at block 502 if the motion of the input device 102 falls beneath a certain threshold quantity. Such periodic resets mitigate the effects of progressively increasing margins of error.

At block 504, a forward prediction $x_{k+1}$ is generated. In one embodiment, the forward prediction is given by the equation $x_{k+1} = (A\hat{x}_k + Bu_k)$. Since the input value $u_k$ is unknown, the input value $u_k$ is ignored according to one embodiment of the present invention. Ignoring the input value $u_k$ may be accomplished by setting B=0 (as defined above), and by subsequently updating the forward prediction by a deterministic input (e.g., as given by the measurement update discussed below with respect to block 508).

Note that proxy values may be used for $u_k$ according to one embodiment of the present invention. In general, any value or quantity which reasonably correlates with the change in acceleration as given between periods k+1 and k may be used according to one embodiment of the present invention.

At block 506, a Kalman gain $K_k$ is calculated. In one embodiment, the Kalman gain $K_k$ comprises a value such that $0 \leq K_k \leq 1$, and is given by the equation $K_k = AP_k C^T (CP_k C^T + S_z)^{-1}$.

In the present context, the term Kalman gain $K_k$ refers to a weight to assign a calculable error in prediction (namely, the second addend $K_k(y_{k+1} - C\hat{x}_k)$ in the measurement update equation given in block 508). In one embodiment, $K_k$ is inversely related to the amount of measurement noise $s_z$ in the system. Thus, if a large amount of noise $s_z$ is expected in the measurement, the Kalman gain $K_k$ will be smaller. If a small amount of noise $s_z$ is expected in the measurement, the Kalman gain $K_k$ will be larger.

At block 508, the prediction $x_{k+1}$ is updated based upon a recorded measurement $y_{k+1}$ (for example, as taken from an accelerometer). In one embodiment, the updated prediction is given by the equation $\hat{x}_{k+1} = (A\hat{x}_k + Bu_k) + K_k(y_{k+1} - C\hat{x}_k)$. The difference yielded from $(y_{k+1} - C\hat{x}_k)$ reflects the error in prediction, and is scaled according to the Kalman gain $K_k$. Thus, if there is no error in prediction, $(y_{k+1} - C\hat{x}_k)$ would equal zero, and no changes would be necessary to $\hat{x}_{k+1} = (A\hat{x}_k + Bu_k)$.

At block 510, the covariance is calculated for $P_{k+1}$. In one embodiment, the calculated covariance is given by the equation $P_{k+1} = AP_k A^T + S_w - AP_k C^T S_z^{-1} CP_k A^T$. The covariance reflects the margin of error and is used in each subsequent calculation of the Kalman gain $K_k$. Thus, if $P_k$ becomes larger with each successive k, $K_k$ becomes smaller.

In order to keep $P_k$ small, one embodiment of the invention employs independent means for estimating motion of the input device 102. For example, in one embodiment, the input device 102 comprises a set of accelerometers adapted to measure acceleration, as well as a vibration module adapted to estimate the velocity of the input device 102 based upon detected vibrational signals. With an independently measured value for velocity, the C vector can be updated to take velocity into account. Taking velocity into account increases the value of the second addend $AP_k C^T S_z^{-1} CP_k A^T$, thereby increasing the difference $AP_k A^T + S_w - AP_k C^T S_z^{-1} CP_k A^T$. Thus, $P_k$ may be kept small, while the Kalman gain $K_k$ remains large.

After the covariance matrix $P_{k+1}$ has been updated, k is adjusted per block 512. In one embodiment, the adjustment comprises setting k=k+1. The process then repeats at block 504 using the new k value.

As stated above, some embodiments of the present invention (including the methods depicted in FIGS. 4 and 5) comprise a prediction algorithm with linear complexity. Such a prediction algorithm preserves computational resources since the prediction for the next period does not require calculations for all periods from the initial period until the prior period.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   predicting, using one or more processors, a position of an input device based at least in part upon a first quantity and a second quantity, where an initial prediction of the position at a next period is generated based upon an updated prediction of the position for a current period and a proxy for an acceleration input;
   updating, using the one or more processors, a confidence value for use in a subsequent prediction, wherein the first quantity includes a predicted velocity of the input device, and wherein the second quantity includes an error in the predicted velocity, where the error in the predicted velocity is determined by subtracting the predicted velocity from a measured value of velocity determined from vibrational signals; and
   resetting a margin of error of values associated with predicting the position of the input device when the velocity of the input device reaches a predefined threshold.

2. The method of claim 1, wherein the input device comprises an accelerometer.

3. The method of claim 1, wherein the second quantity further comprises a scaling value.

4. The method of claim 3, wherein the scaling value is based at least in part upon the confidence value and a noise value.

5. The method of claim 4, wherein the noise value is based at least in part upon characteristics of an accelerometer.

6. The method of claim 4, wherein the scaling value is inversely related to the noise value.

7. The method of claim 3, wherein the second quantity comprises a product of the scaling value and the error in prediction.

8. The method of claim 7, wherein the error in prediction comprises the difference between a recorded acceleration and a predicted acceleration of the input device.

9. The method of claim 3, wherein the scaling value is calculated as a Kalman gain.

10. An apparatus comprising:
    a printed circuit board including:
    one or more sensors;
    one or more processors;
    memory configured for storing instructions, which, when executed by the one or more processors, causes the one or more processors to perform operations comprising:

predicting, using one or more processors, a position of an input device based at least in part upon a first quantity and a second quantity, where an initial prediction of the position at a next period is generated based upon an updated prediction of the position for a current period and a proxy for an acceleration input;

updating, using the one or more processors, a confidence value for use in a subsequent prediction, wherein the first quantity includes a predicted velocity of the input device, and wherein the second quantity includes an error in the predicted velocity, where the error in the predicted velocity is determined by subtracting the predicted velocity from a measured value of velocity determined from vibrational signals; and resetting a margin of error of values associated with predicting the position of the input device when a velocity of the input device reaches a predefined threshold.

11. The apparatus of claim 10, wherein the one or more sensors includes an accelerometer.

12. The apparatus of claim 10, wherein the second quantity further comprises a scaling value that is based at least in part upon the confidence value and a noise value.

13. The apparatus of claim 10, further comprising a circuit to transmit the output of the one or more processors to display update logic.

14. The apparatus of claim 10, wherein the noise value is determined from results of a calibration sequence associated with the one or more sensors.

15. The apparatus of claim 10, wherein the noise value is based at least in part upon characteristics of the one or more sensors.

* * * * *